United States Patent
Mermoud et al.

(10) Patent No.: US 11,456,926 B1
(45) Date of Patent: Sep. 27, 2022

(54) ASSESSING THE TRUE IMPACT OF PREDICTIVE APPLICATION-DRIVEN ROUTING ON END USER EXPERIENCE

(71) Applicant: Cisco Technology, Inc., San Jose, CA (US)

(72) Inventors: Grégory Mermoud, Venthône (CH); Jean-Philippe Vasseur, Saint Martin d'Uriage (FR); Vinay Kumar Kolar, San Jose, CA (US); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/314,532

(22) Filed: May 7, 2021

(51) Int. Cl.
| | | |
|---|---|---|
| *H04L 41/16* | (2022.01) | |
| *H04L 41/5067* | (2022.01) | |
| *H04L 41/147* | (2022.01) | |
| *H04L 41/50* | (2022.01) | |

(52) U.S. Cl.
CPC ............ *H04L 41/16* (2013.01); *H04L 41/147* (2013.01); *H04L 41/5032* (2013.01); *H04L 41/5067* (2013.01)

(58) Field of Classification Search
CPC ... H04L 41/147; H04L 41/16; H04L 41/0823; H04L 41/0803
See application file for complete search history.

(56) References Cited

U.S. PATENT DOCUMENTS

| | | |
|---|---|---|
| 10,680,911 B2 | 6/2020 | Ramakrishnan et al. |
| 2015/0317197 A1* | 11/2015 | Blair ................. H04L 41/147 714/47.3 |
| 2015/0373565 A1 | 12/2015 | Safavi |
| 2016/0028594 A1 | 1/2016 | Ramakrishnan et al. |
| 2016/0065419 A1 | 3/2016 | Szilagyi et al. |
| 2018/0006931 A1* | 1/2018 | Ellis ................... H04L 43/0852 |
| 2020/0274782 A1 | 8/2020 | Balaiah et al. |
| 2020/0314022 A1 | 10/2020 | Vasseur et al. |

OTHER PUBLICATIONS

"End User Experience Management", AppDynamics Pro Documentation, Version 4.0.x, Jul. 2015, 392 pages, AppDynamics.
"Vyopta for Cisco Webex Meetings", online: https://www.vyopta.com/product/what-we-cover/cisco/webex/, accessed Apr. 12, 2021, 11 pages, Vyopta.com.
(Continued)

*Primary Examiner* — Adnan M Mirza
(74) *Attorney, Agent, or Firm* — Behmke Innovation Group; Kenneth J. Heywood; Jonathon P. Western

(57) ABSTRACT

In one embodiment, a supervisory service for a network obtains a first set of user experience survey data from users of an online application whose traffic was rerouted by a predictive routing engine. The supervisory service obtains a second set of user experience survey data from users of the online application whose traffic was not rerouted by the predictive routing engine. The supervisory service generates, using the first set of user experience survey data and the second set of user experience survey data, a user experience prediction model to predict user experience scores for the online application. The supervisory service adjusts the predictive routing engine using predicted user experience scores from the user experience prediction model.

20 Claims, 9 Drawing Sheets

(56) References Cited

OTHER PUBLICATIONS

Jahromi, et al., "Towards Application-Aware Networking: ML-Based End-to-End Application KPI/QoE Metrics Characterization in SDN", 2018 Tenth International Conference on Ubiquitous and Future Networks (ICUFN), Jul. 2018, pp. 126-131, IEEE, Prague, Czech Republic.
"Application Monitoring", online: https://www.dynatrace.com/monitoring/solutions/application-monitoring/, accessed Apr. 12, 2021, 10 pages, Dynatrace LLC.
"The OneAgent Advantage", online: https://www.dynatrace.com/platform/oneagent/, accessed Apr. 12, 2021, 10 pages, Dynatrace LLC.

* cited by examiner

ASSESSING THE TRUE IMPACT OF PREDICTIVE APPLICATION-DRIVEN ROUTING ON END USER EXPERIENCE

TECHNICAL FIELD

The present disclosure relates generally to computer networks, and, more particularly, to assessing the true impact of predictive application-driven routing on end user experience.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, a key observation is that this approach is simplistic in that it assumes a direct correlation between SLA violations and the experience of users with the application. In other words, network metrics are used as a proxy for the true end user experience, which is not actually the case.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
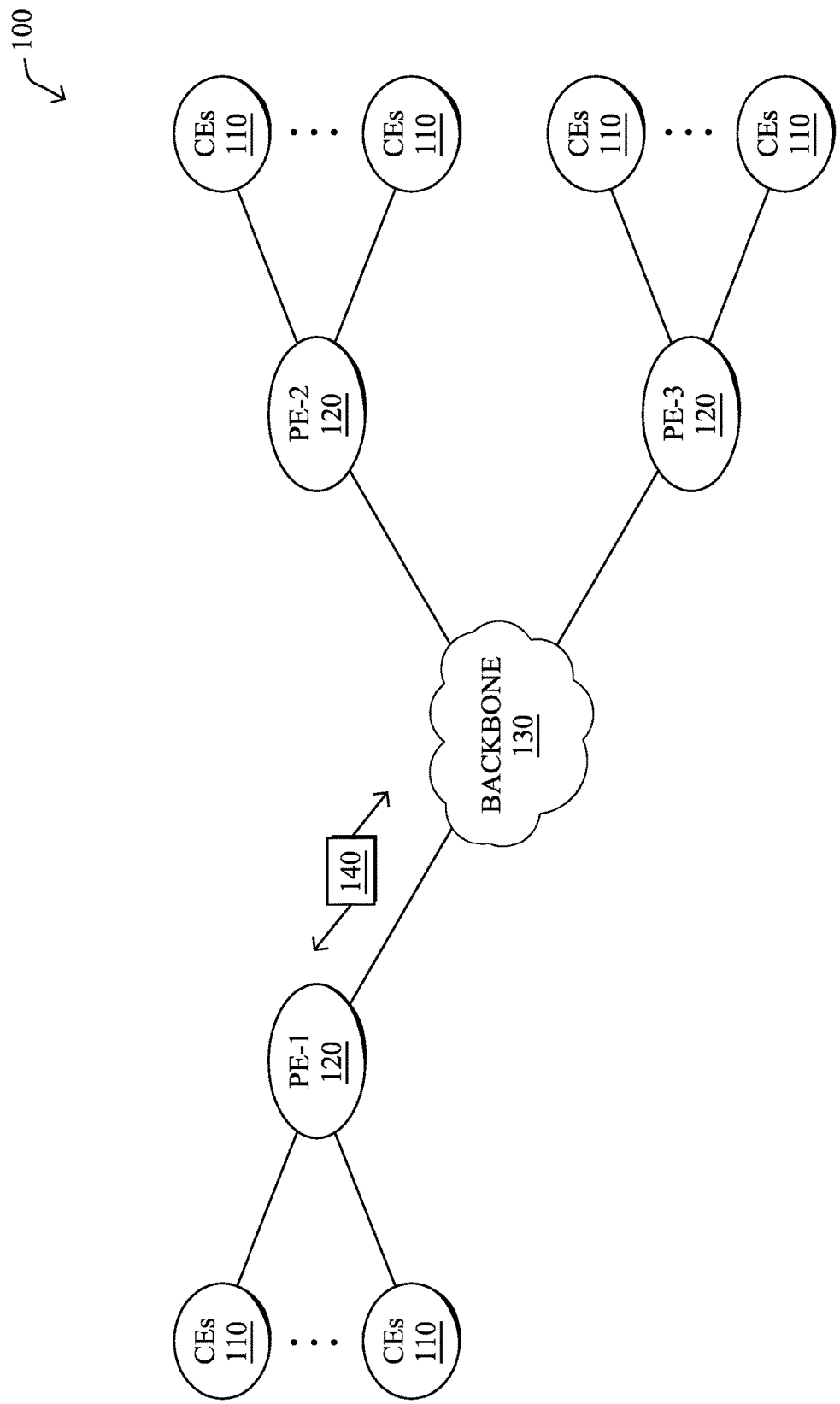
FIGS. 1A-1B illustrate an example communication network.

According to one or more embodiments of the disclosure, a supervisory service for a network obtains a first set of user experience survey data from users of an online application whose traffic was rerouted by a predictive routing engine. The supervisory service obtains a second set of user experience survey data from users of the online application whose traffic was not rerouted by the predictive routing engine. The supervisory service generates, using the first set of user experience survey data and the second set of user experience survey data, a user experience prediction model to predict user experience scores for the online application. The supervisory service adjusts the predictive routing engine using predicted user experience scores from the user experience prediction model.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
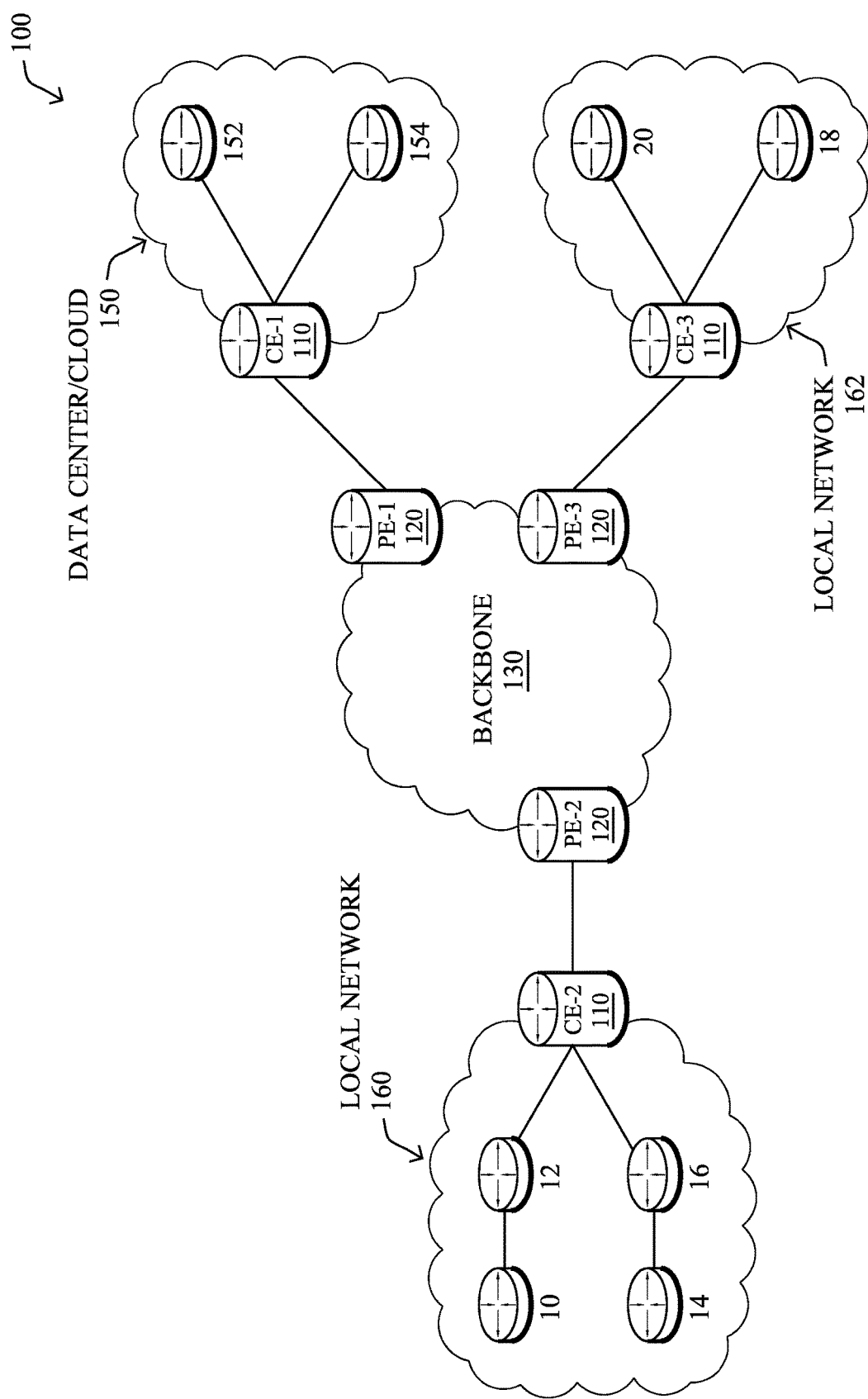

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
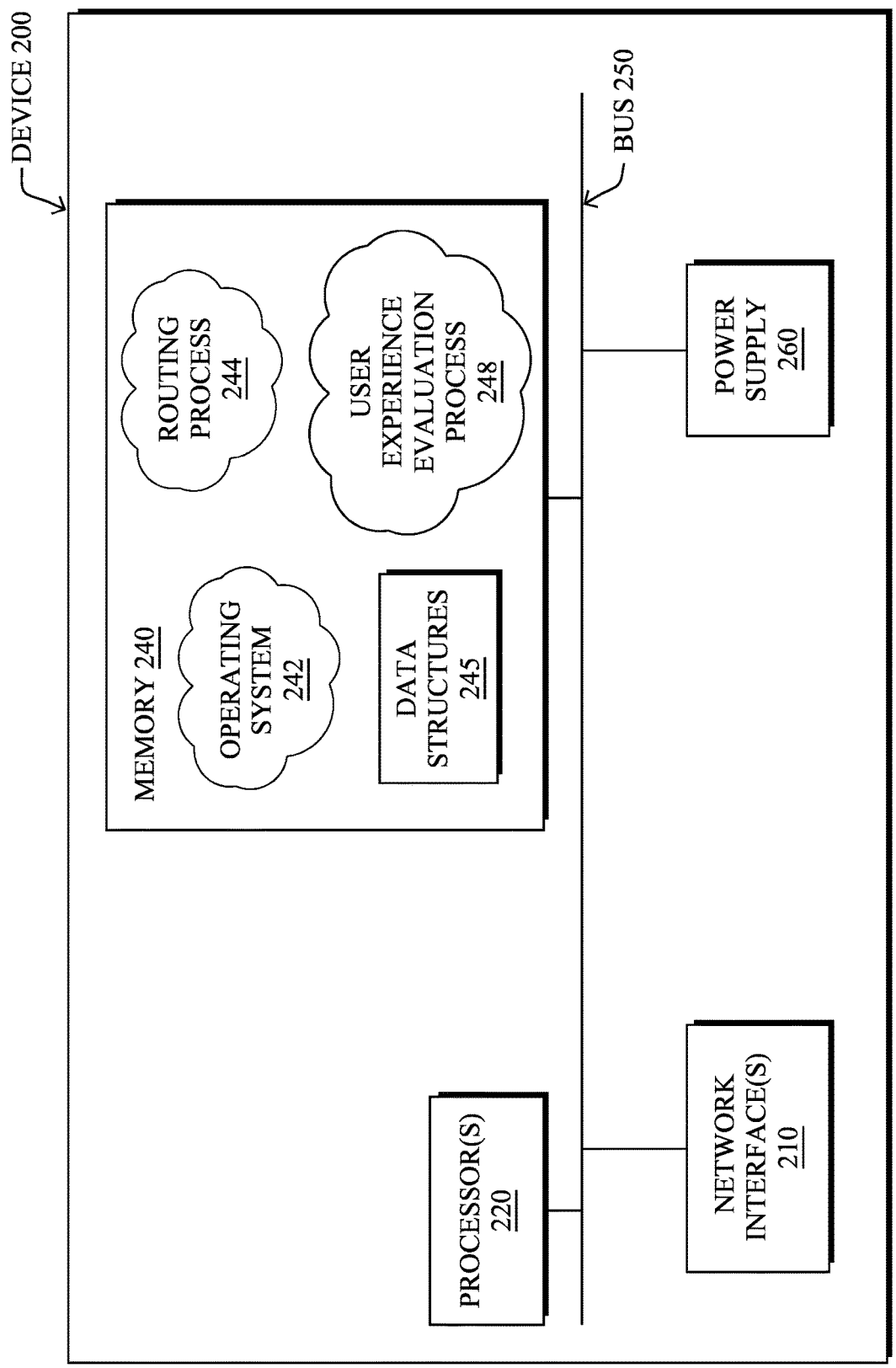
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a user experience evaluation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or user experience evaluation process 248 may also include computer executable instructions that, when executed by processor(s) 220, cause device 200 to perform the techniques described herein. To do so, in some embodiments, routing process 244 and/or user experience evaluation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or user experience evaluation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or user experience evaluation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
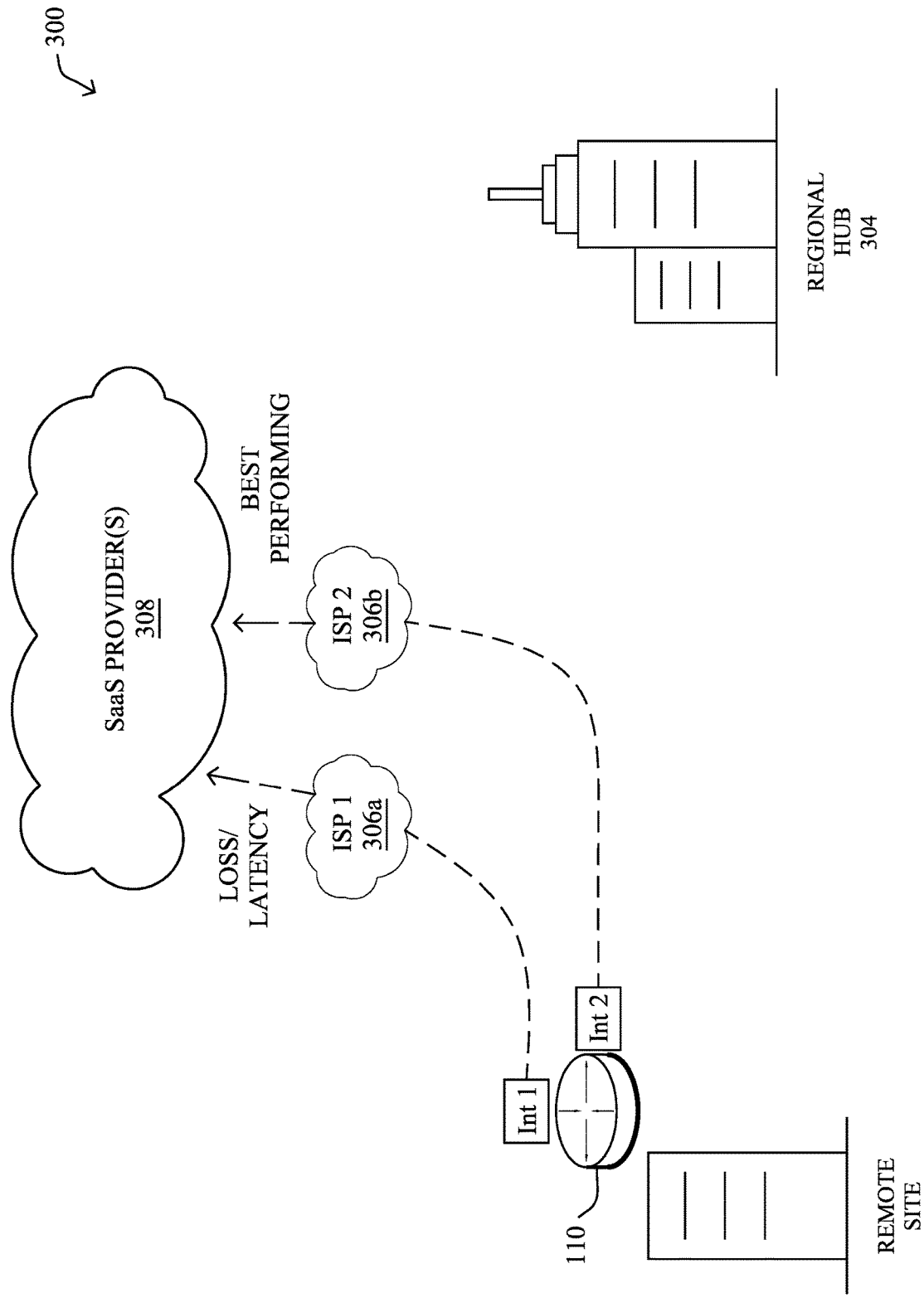
FIGS. 3A-3B illustrate example network deployments.
Figure 3B:
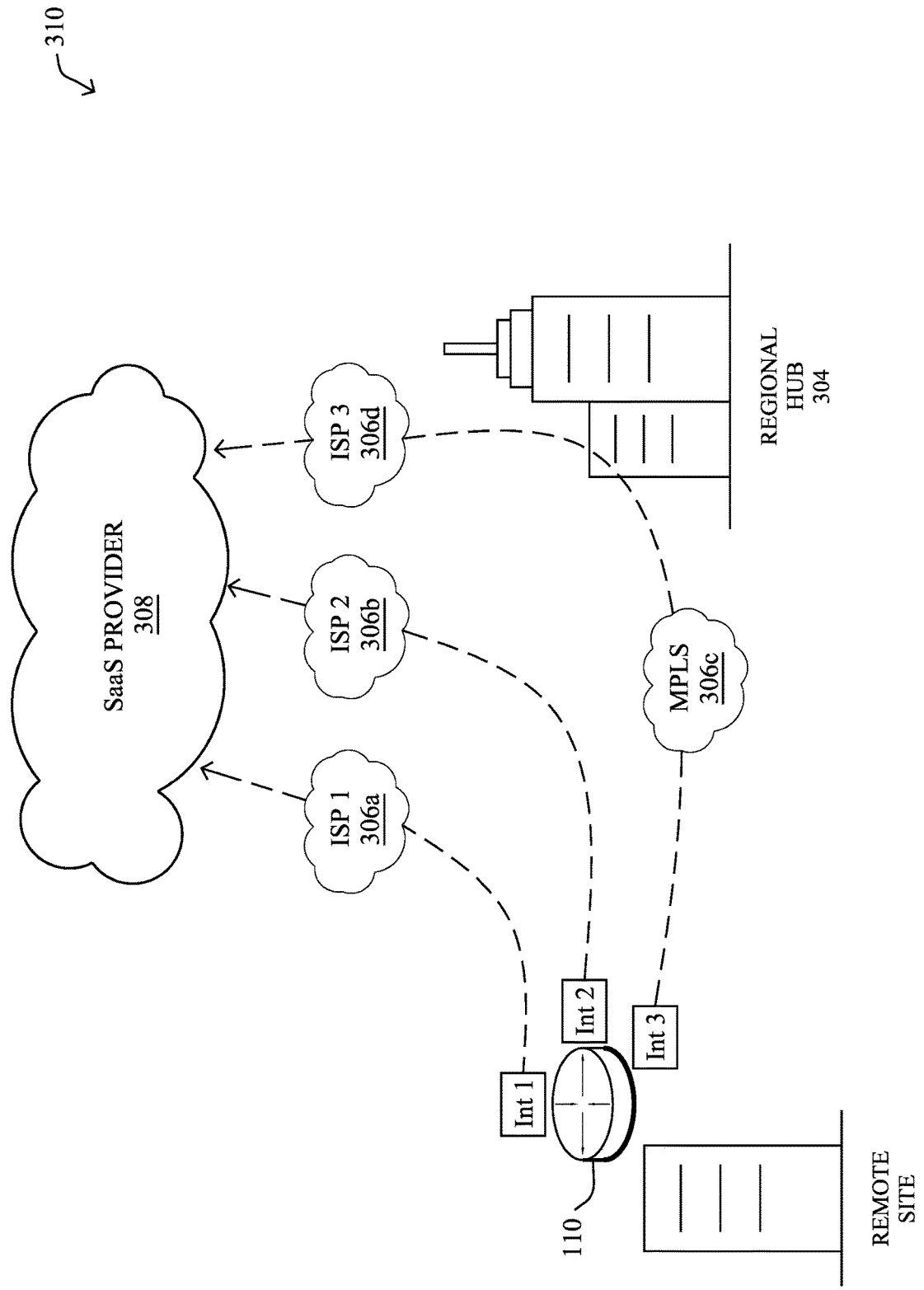

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
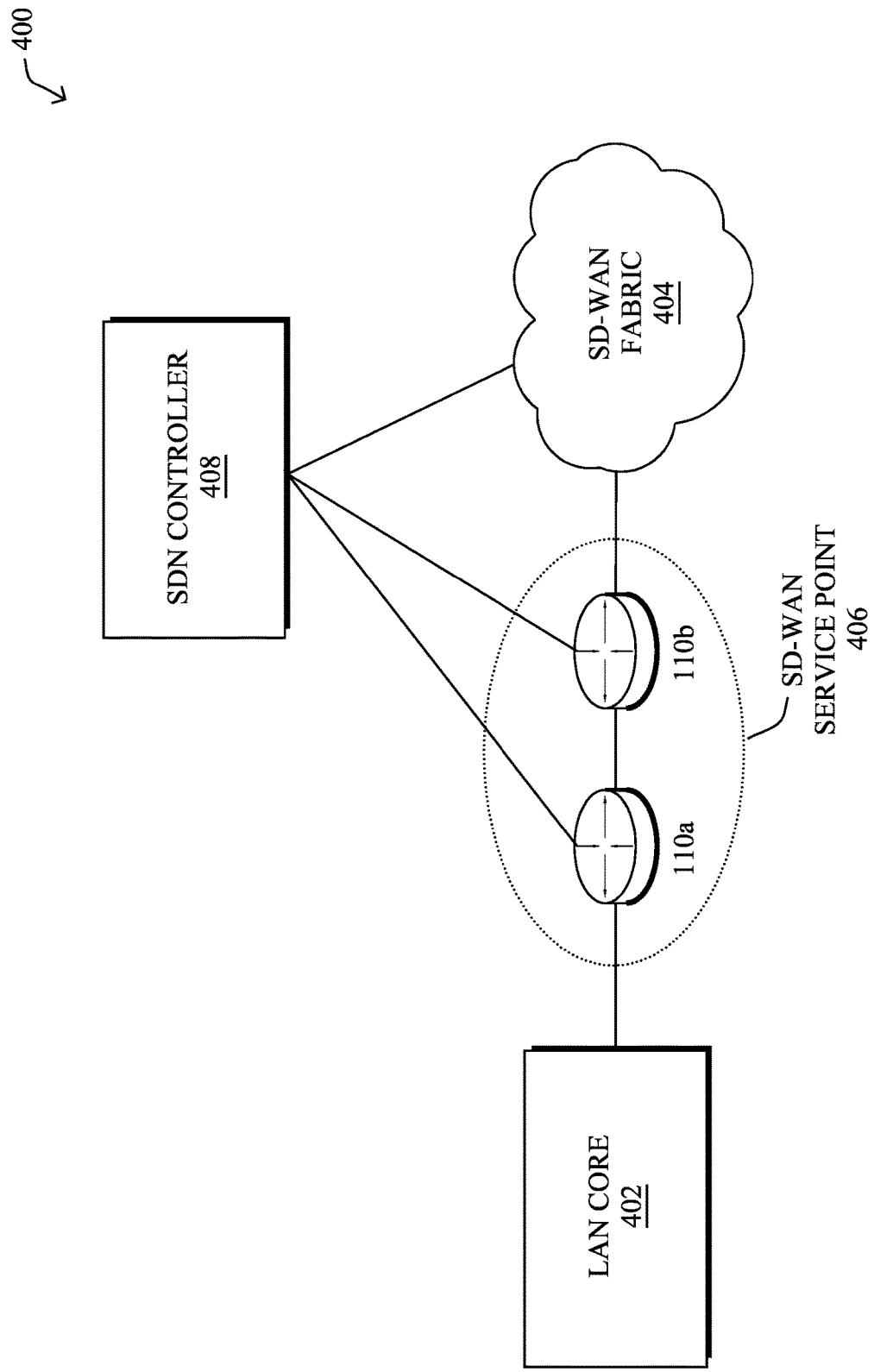
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS. LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
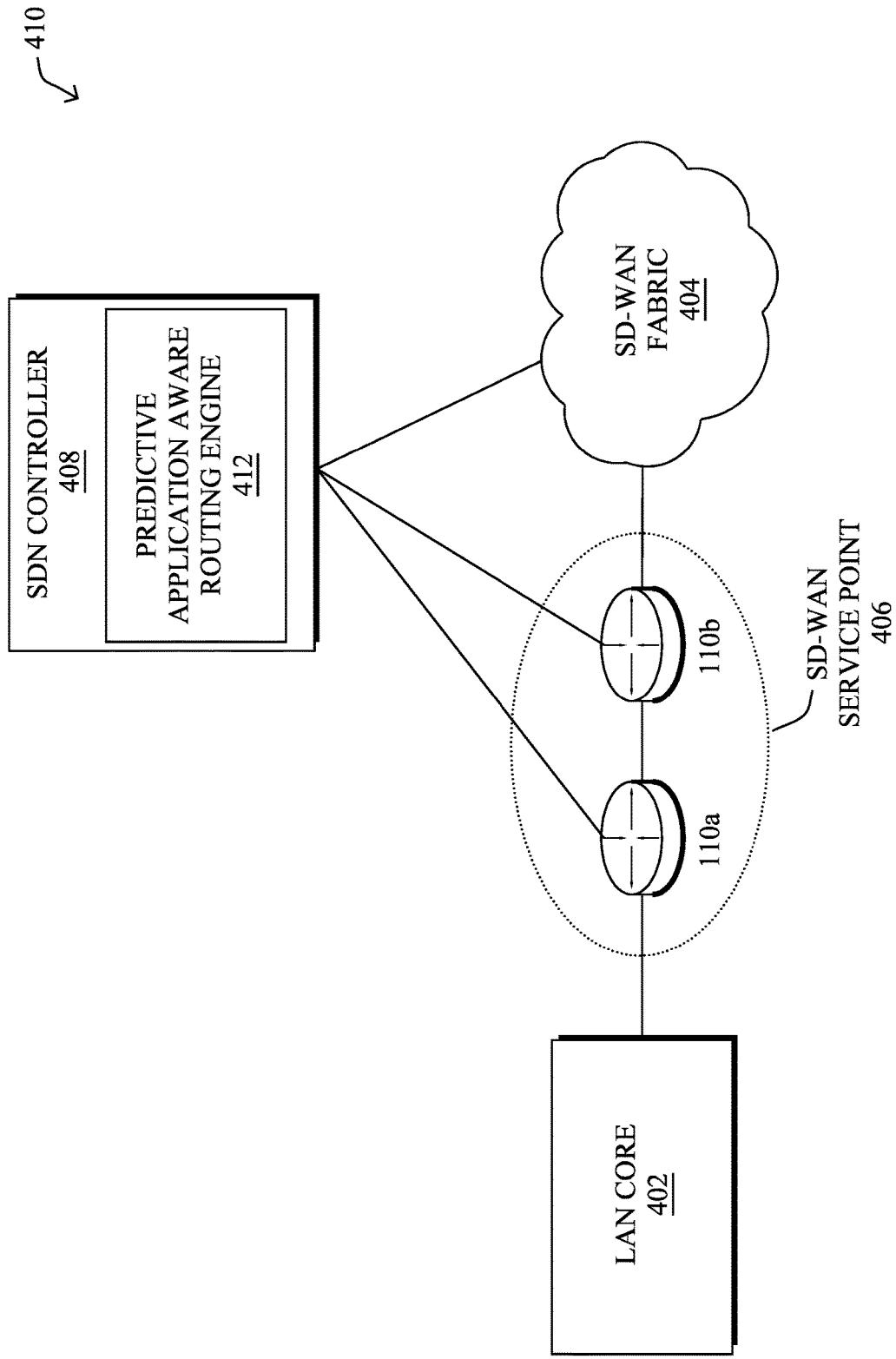

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or user experience evaluation process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, a predictive application aware routing engine can directly modify the routing of online applications across private networks and the Internet so as to avoid disruptions to the application experience. However, this is typically done today by inferring the application experience from the SLA templates applied to network metrics such as the latency, loss, and jitter.

Assessing the True Impact of Predictive Routing on End User Experience

The techniques introduced herein allow for the assessment of the true impact of predictive routing on the application experience of end users. In some aspects, the techniques herein selectively survey different sets of users, such as those whose traffic was proactively rerouted and those whose traffic was not rerouted. In turn, this feedback can be used to adjust the internal objective metric of the system and gradually shift it to a more accurate estimate of the true user experience, instead of an approximative proxy based on static SLA templates.

Illustratively, the techniques described herein may be performed by hardware, software, and/or firmware, such as in accordance with user experience evaluation process 248, which may include computer executable instructions executed by the processor 220 (or independent processor of interfaces 210) to perform functions relating to the techniques described herein (e.g., in conjunction with routing process 244).

Specifically, according to various embodiments, a supervisory service for a network obtains a first set of user experience survey data from users of an online is application whose traffic was rerouted by a predictive routing engine. The supervisory service obtains a second set of user experience survey data from users of the online application whose traffic was not rerouted by the predictive routing engine. The supervisory service generates, using the first set of user experience survey data and the second set of user experience survey data, a user experience prediction model to predict user experience scores for the online application. The supervisory service adjusts the predictive routing engine using predicted user experience scores from the user experience prediction model. In further aspects, the techniques herein also introduce a local agent that can be used to capture the user feedback regarding their application experience.

Figure 5:
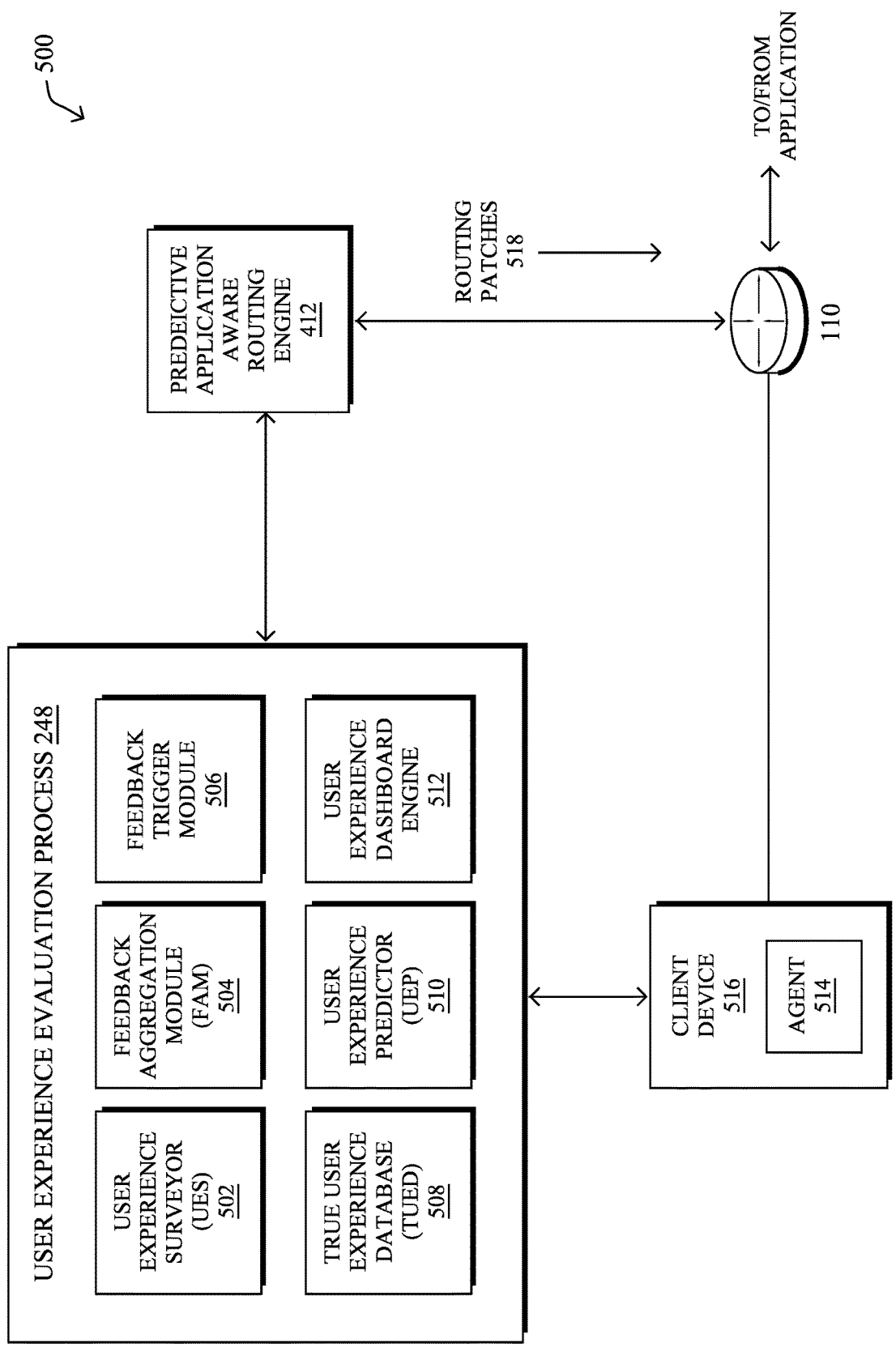
FIG. 5 illustrates an example architecture for assessing the impact of predictive routing on end user experience.

Operationally, FIG. 5 illustrates an example architecture 500 for assessing the impact of predictive routing on end user experience, according to various embodiments. At the core of architecture 500 is user experience evaluation process 248, which may be executed by a controller for a network or another device in communication therewith. For instance, user experience evaluation process 248 may be executed by a controller for a network (e.g., SDN controller 408 in FIGS. 4A-4B), a particular networking device in the network (e.g., a router, etc.), another device or service in communication therewith, or is the like, to provide a supervisory service to the network.

As shown, user experience evaluation process 248 may include any or all of the following components: a user experience surveyor (UES) 502, a feedback aggregation module (FAM) 504, a feedback aggregation module (FAM) 504, a feedback trigger module 506, a true user experience database (TUED) 508, a user experience predictor (UEP) 510, and/or a user experience dashboard engine 512. As would be appreciated, the functionalities of these components may be combined or omitted, as desired. In addition, these components may be implemented on a singular device or in a distributed manner, in which case the combination of executing devices can be viewed as their own singular device for purposes of executing user experience evaluation process 248.

During execution, user experience evaluation process 248 may interact with predictive application aware routing engine 412, which is responsible for predicting disruptions to application traffic and pushing routing patches 518 to the relevant networking devices, such as router 110. In general, routing patches 518 comprise routing configuration changes, such as instructions to move application traffic from one network path to another (e.g., to switch from an MPLS link to Internet or vice-versa, etc.). Typically, as noted above, this may be done by comparing predicted network metrics for the paths and the SLA templates for the application traffic. However, doing so may differ from the true impact on the end user experience. Thus, a key function of user experience evaluation process 248 is to provide greater insight into the user experience into the predictive routing mechanism.

In some embodiments, user experience surveyor (UES) 502 may perform empirical measurements of the user experience in different networks or different regions of the same network by surveying the end users of an online application, directly. In a simple embodiment, this can be achieved through the use of in-app surveys. To this end, UES 502 may initiate the collection of user experience survey data by asking the backend application to survey a user, such as in conjunction with feedback trigger module 506 described below.

In another embodiment, UES 502 may obtain user experience survey data by directly messaging the end users. For instance, UES 502 may send a custom message to an end user via email, text, messaging application, etc., with detailed information about the session (e.g., application, duration of the session) and an ask the user to provide a rating (e.g., 1-5 stars, a binary like/dislike, etc.) about the application session. Of course, this mechanism may only be available in situations where UES 502 can map a given session to some end user identifier and coordinates (e.g., cell phone number, email address, etc.).

According to various embodiments, another mechanism that UES 502 may leverage to obtain user experience survey data is through the use of a local agent 514 installed to an end user client, such as client device 516. In this case, UES 502 may request that agent 514 query the end user of client device 516 for feedback regarding their experience with the online application. Agent 514 then forwards this feedback data to UES 502. In various instances, agent 514 may be implemented as an extension to an existing program on client device 516, such as part of a VPN program, device health or firewall program, or the like.

More specifically, a goal of agent. 514 is to monitor the egress traffic of client device 516 and identify the traffic going to various SaaS applications of interest. To achieve that, it may use a database of IP prefixes that are typically used by these applications or snoop the DNS traffic, in order to identify resolutions to known servers of these applications. In either case, this information is never shared with any other cloud service. The only goal of this operation is for agent 514 to determine whether the user is using a given online application.

As online applications are used, agent 514 may try to estimate the user experience. This can consist of probing the service for the delay, loss, and jitter while the user is using the online application. Another approach may consist of estimating the user experience by using Deep Packet Inspection (DPI), such as by estimating the bitrate of the application flows for voice, video, etc. Typically, such quantities can be indicative of the user experience. Yet another approach is to rely on local application programming interfaces (APIs) between agent 514 and the client program for the application. For instance, the WebEx client can locally expose live metrics about an ongoing call over a local socket or similar. Clients often compute these metrics with the aim of reporting them to the SaaS anyway. In other cases, local logs produced by application clients can be used (e.g., clients can log session start/end, etc.). The key aspect here is that agent 514 will construct a record that contains statistics about the session to a given online application.

Another function of agent 514 is to query users for feedback about their experience using a particular online application. This can be done at any point in time during the usage of a given application, or at the end of a session (e.g., at the end of a video conference). Agent 514 may use various approaches to ask for the feedback of the user, but it is typically done via a non-intrusive popup, such as by asking any of the following:

You seem to experience difficulties with application X. Is that correct? Yes|No or:

Can you rate your experience with application X right now? Good|Degraded|Bad

These popups may take a different form depending on the platform: laptop, mobile phone, tablet, browser. In any case, one key aspect of the techniques herein is that agent 514 may make these queries in an adaptive fashion, and only in situations where a label is deemed valuable. In particular, extreme situations where the experience is obviously bad (e.g., complete lack of connectivity) or obviously good (e.g., stellar metrics) may not lead to any surveying of the user. For example, agent 514 may prompt the user with a popup message upon detecting anomalies tied to a specific network or application variables that may have an implication on the application user experience. For instance, agent 514 may detect a statistical outlier for the TCP round trip time, or the packet loss variable (e.g., if the z-score is greater than X). In another embodiment, the agent 514 may apply anomaly detection to any variable, with the attempt to detect which variables may have a direct implication on the user experience for a given application. Note that such exploration mechanisms are of the utmost importance allowing for discovering which aspects of network communication do have a real impact on the user experience thanks to popup survey message that allows for quick feedback, forming a control loop with the user.

Feedback aggregation module (FAM) 504 may be responsible for collecting user experience survey data from their available sources, such as local agent 514, the online application itself, and/or direct surveying of the users through other communication mechanisms. Typically, this information may include both the feedback supplied by the user of the application, as well as any measured network metrics associated with their session (e.g., based on probing, DPI, etc.). Typically, these records are anonymized, such that they cannot be used to recognize the user. In particular, the private and public IP addresses of the user may be removed and only the prefix it belongs to may be reported. Records are small and can may also be sent to FAM 504 by agent 514 when client device 516 is idle, to minimize the impact.

The collected user experience survey records may also be used to estimate the experience of users of a given application from a given region of the Internet, geographic region, or the like. Such records also allow for discovering which network variables have an influence on the user application experience. Furthermore, the records may be used to refine machine learning models, such as UEP 510, to infer the user experience for a given application from indirect metrics such as loss, latency, jitter, or bitrate. In some embodiments, UES 502 may also use the provided feedback to potentially remove a user from the process, should the user provide feedback that seems to differ significantly from all other users. In turn, UES 502 may signal the local agents, such as agent 514, so that they can refine their decisions to survey a user or not.

In another embodiment, the user may proactively provide feedback about the application. For instance, assume that the user of client device 516 is participating in a voice call and experiences a degraded voice quality. In such a case, the user may open agent 514 and report the degradation. Agent 514 would know from context that the user is using a given application, so this operation could be extremely fast and non-disruptive. Of course, the user of client device 516 may also be able to opt into or out of participation in user experience surveys.

In some embodiments, agent 514 may also be configured to inform the user of client device 516 of the expected experience for the current application on alternative paths and to trigger a re-route. In this instance, agent 514 may not only estimate the performance of the application on the current path, but may also query predictive application aware routing engine 412 to get a forecast of the performance of the application on alternate paths. For instance, agent 514 may suggest to the user of client device 516 that they should access the application using an LTE link, using Wi-Fi, using a different provider, etc. The user may then approve the change and agent 514 may reconfigure the underlying operating system of client device 516 to switch to the alternate interface for the specific flows (when possible). This ability is especially powerful on mobile devices where the experience over LTE might be very different than over Wi-Fi. It, is also useful in situations for desktops and laptops with multiple interfaces connected to different service providers, or with LTE connectivity as well.

Another potential component of user experience evaluation process 248 is feedback trigger module 506, which is responsible for explicitly requesting user experience survey feedback for arbitrary users from trusted entities (e.g., by sending a request to the BCOS server of Microsoft, a WebEx log collection agent, etc.). It is also responsible for sending triggers to the agent 514, using a push or pull message passing mechanism. This allows the system to monitor the metrics of the calls across multiple locations and/or networks, and explicitly request for the user feedback at arbitrary times. In one embodiment, these trusted entities monitor network and implicit user-experience metrics (such as precomputed MOS scores) for all the calls in real-time. If it determines that the traffic is degrading on some calls from a given branch router or service provider in a city, then it will choose a subset of involved users and can send a trigger to request feedback. The selection of users can be random or can be intelligently chosen based on, say, users whose current experience is predicted to go bad based on observing metrics. In cases where the user is behind a network address translation (NAT) and a direct trigger cannot be sent, polling mechanisms can be employed where agent 514 will periodically poll feedback trigger module 506 to check if there are any feedback requests.

Regardless of the survey mechanism, LIES 502 has the same fundamental role: to decide which of the millions of active sessions of the online application should be surveyed. In particular, LIES 502 may split sessions into two sets: one for which routing patches were applied by predictive application aware routing engine 412 and one for which routing patches were not applied. UES 502 may then selects a fraction of the sessions in each set and triggers user experience surveys for them. Based on the outcome of these surveys, it may then measure the impact of predictive application aware routing engine 412 on the user experience. These surveys can of course be tailored to only specific users, types of networks or paths, countries, etc. The experiments can also be designed per-path or per-site to ensure that the bias from few good paths does not affect the results. For example, all paths from a site can be accumulated. Then, the path recommended by predictive application aware routing engine 412 can be selected for a subset of users, and the standard path for others. The survey results for the two groups can then be used to infer whether the recommendations of predictive application aware routing engine 412 were actually beneficial to the user experience.

In some embodiments, user experience evaluation process 248 may store the obtained user experience survey data in true user experience database (TUED) 508. This database contains the outcome of every survey, along with the original network metrics for the corresponding session. In some instances, entries in TUED 508 may be purged, such as those that are older than a threshold amount of time, based on other characteristics, or the like.

In various embodiments, user experience evaluation process 248 may also include UEP 510, which is configured to train and maintain one or more machine learning-based models that predict the true user experience from the original networking metrics. These user experience prediction models can take a broad range of forms, including deep neural networks that leverage a large number of features that are specific to the user, its business role, its location, the type of end device.

In one optional embodiment, the predictions of UEP 510 are gradually used as a replacement for the probability of violation used by predictive application aware routing engine 412 as an initial proxy for the user experience. That way, as TUED 508 gets enriched by more and more surveys triggered by LIES 502, the overall system becomes more and more effective at improving the real objective function, which is the user experience itself, and not a proxy thereof based on a static SLA template. At first, the system operates entirely on the assumption that the user experience is reflected by the SLA templates based on the underlying QoS metrics (loss, latency, jitter), but as more labels are collected by UES 502, the accuracy of the user experience prediction model(s) of UEP 510 increases and their predictions are increasingly used by the overall system to make routing forecasts and decisions. Different approaches can be used in this gradual shift from SLA templates to UEP prediction. For instance, a smooth weighted averaging of both inputs done across the entire network could be used, or a binary switch from one to the other for only a subset of the paths to validate the outcome. A combination thereof is also possible, but the amplitude of the shift is always governed by the weight given to the input of UEP 510. This weight may be dynamically adjusted as a function of the cross-validation error of its predictions on TUED 508. Two embodiments are possible to achieve this:

1. In one simple embodiment, cross-validation can evaluate various convex combinations of the predictions of UEP 510 and of the probability of violation. For each weight value in a grid covering [0, 1] (say, of the probability of violation), cross-validation is used to evaluate the prediction error based on TUED 508. The best convex combination is then selected.
2. In another embodiment, to avoid reusing a single dataset, which can lead tot overfitting and limit computational costs, the system can track the current weight of the violation probability in the convex combination, and only do a local search for values close to the current weight. This also ensures that the system can only evolve in a smooth manner in terms of combining both inputs.

This error can be also evaluated specifically for a specific entity (e.g., a business, school, etc.), a subset of the users, or a subset of a given network, so that predictive application aware routing engine 412 accounts more or less of its predictions depending on the specificities of the latter elements. It is particularly important in situations where the amount of feedback for a given entity or user base is not enough to make a precise assessment. The key here is that, predictive application aware routing engine 412 is no longer making routing decisions in an open loop. Through the predictions by UEP 510, predictive application aware routing engine 412 is gradually adjusted to become closer and closer to achieving the optimal user experience for the online application.

Another potential component of user experience evaluation process 248 is user experience dashboard engine 512, which is configured to provide data to user interfaces indicative of the obtained user experience survey data and/of the predicted user experience scores by UEP 510. This data allows a network administrator to review true user experience metrics, along with a way for the network operator to drill down on specific surveys. In an optional embodiment of the component, the operator can also trigger a specific survey via user experience dashboard engine 512, which will be scheduled and executed by UES 502.

Figure 6:
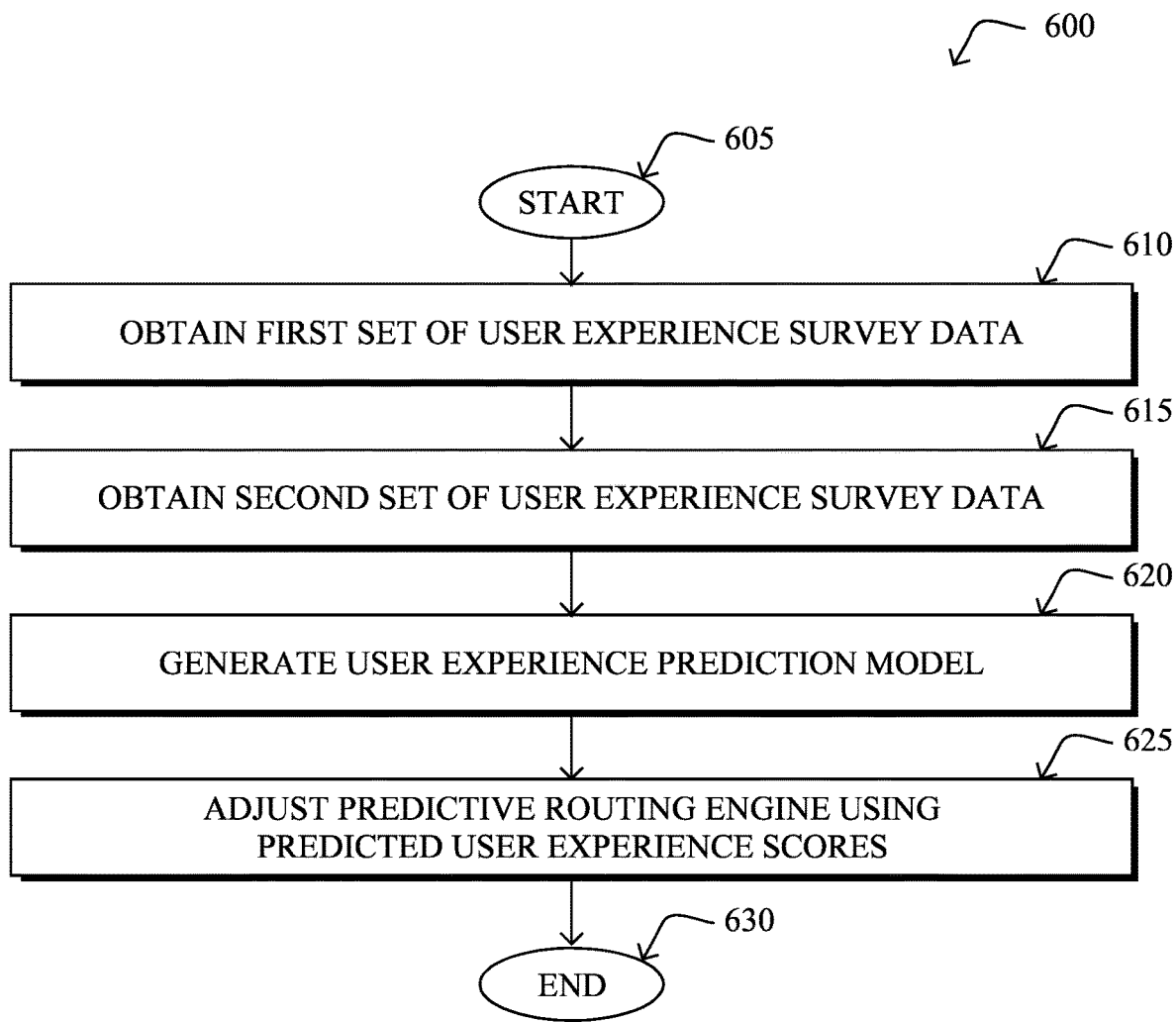
FIG. 6 illustrates an example simplified procedure for assessing the impact of predictive routing on end user experience.

FIG. 6 illustrates an example simplified procedure 600 for assessing the impact of predictive routing on end user experience, in accordance with one or more embodiments described herein. For example, a non-generic, specifically configured device (e.g., device 200), such as controller for a network (e.g., an SDN controller or other device in communication therewith), may perform procedure 600 by executing stored instructions (e.g., routing process 244 and/or user experience evaluation process 248), to provide a supervisory service to a network. The procedure 600 may start at step 605, and continues to step 610, where, as described in greater detail above, the supervisory service may obtain a first set of user experience survey data from users of an online application whose traffic was rerouted by a predictive routing engine. In some embodiments, the predictive routing engine may reroute the traffic to avoid SLA violations associated with the traffic.

At step 615, as detailed above, the supervisory service may obtain a second set of user experience survey data from users of the online application whose traffic was not rerouted by the predictive routing engine. In some embodiments, the predictive routing engine may have predicted disruptions to traffic of at least some of these users, but their traffic was ultimately not rerouted (e.g., due to the suggested routing patch conflicting with other patches, there not being a suitable alternate route, etc.). In various embodiments, the survey data may be obtained at least in part from local agents executed by devices of the users, surveys conducted within the online application, combinations thereof, or the like.

At step 620, the supervisory service may generate, using the first and second sets of user experience survey data, a user experience prediction model to predict user experience scores for the online application, as described in greater detail above. In various embodiments, the model may take the form of a machine learning-based model that predicts user experience scores based on measured network metrics. In general, the user experience scores quantify a degree of satisfaction that users have with the application.

At step 625, as detailed above, the supervisory service may adjust the predictive routing engine using predicted user experience scores from the user experience prediction model. In some embodiments, this may entail adjusting the engine to predict disruptions to traffic of the online application based on the predicted user experience scores. In other words, rather than simply relying on network metrics to make its rerouting decisions, the engine may consider the impact to user experience. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the consideration of user experience when making predictive routing decisions. Rather than simply relying on predicted violations of SLA templates to drive rerouting decisions, the system introduced herein is able to make more informed decisions, so as to optimize the user experience with an online application.

While there have been shown and described illustrative embodiments that provide for assessing the true impact of predictive routing decisions, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a supervisory service for a network, a first set of user experience survey data from a first set of users of an online application whose traffic was rerouted by a predictive routing engine;
   obtaining, by the supervisory service, a second set of user experience survey data from a second set of users of the online application whose traffic was not rerouted by the predictive routing engine;
   generating, by the supervisory service and using the first set of user experience survey data and the second set of user experience survey data, a user experience prediction model to predict user experience scores for the online application; and
   adjusting, by the supervisory service, the predictive routing engine using predicted user experience scores from the user experience prediction model.

2. The method as in claim 1, wherein the predictive routing engine reroutes traffic for the online application to avoid violations of a service level agreement (SLA) associated with the traffic.

3. The method as in claim 1, wherein adjusting the predictive routing engine comprises:
   adjusting the predictive routing engine to predict disruptions to traffic of the online application based on the user experience scores from the user experience prediction model.

4. The method as in claim 1, wherein the predictive routing engine predicted disruptions to traffic of the second set of users of the online application whose traffic was not rerouted.

5. The method as in claim 1, further comprising:
   providing, by the supervisory service, data indicative of the first set of user experience survey data to a user interface.

6. The method as in claim 1, wherein the first set of user experience survey data and the second set of user experience survey data are obtained at least in part from local agents executed by devices of the first and second sets of users.

7. The method as in claim 1, wherein the first set of user experience survey data and the second set of user experience survey data are obtained at least in part from surveys conducted within the online application.

8. The method as in claim 1, wherein the user experience prediction model is a machine learning-based model.

9. The method as in claim 1, wherein the online application is a software as a service (SaaS) application.

10. The method as in claim 1, wherein the network is a software defined network and wherein the predictive routing engine reroutes traffic for the online application via a controller for the software defined network.

11. An apparatus, comprising:
    one or more network interfaces;
    a processor coupled to the one or more network interfaces and configured to execute one or more processes; and
    a memory configured to store a process that is executable by the processor, the process when executed configured to:
       obtain a first set of user experience survey data from a first set of users of an online application whose traffic was rerouted by a predictive routing engine;
       obtain a second set of user experience survey data from a second set of users of the online application whose traffic was not rerouted by the predictive routing engine;
       generate, using the first set of user experience survey data and the second set of user experience survey data, a user experience prediction model to predict user experience scores for the online application; and
       adjust the predictive routing engine using predicted user experience scores from the user experience prediction model.

12. The apparatus as in claim 11, wherein the predictive routing engine reroutes traffic for the online application to avoid violations of a service level agreement (SLA) associated with the traffic.

13. The apparatus as in claim 11, wherein the apparatus adjusts the predictive routing engine by:
    adjusting the predictive routing engine to predict disruptions to traffic of the online application based on the user experience scores from the user experience prediction model.

14. The apparatus as in claim 11, wherein the predictive routing engine predicted disruptions to traffic of the second set of users of the online application whose traffic was not rerouted.

15. The apparatus as in claim 11, wherein the process when executed is further configured to:
    provide data indicative of the first set of user experience survey data to a user interface.

16. The apparatus as in claim 11, wherein the first set of user experience survey data and the second set of user experience survey data are obtained at least in part from local agents executed by devices of the first and second sets of users.

17. The apparatus as in claim 11, wherein the first set of user experience survey data and the second set of user experience survey data are obtained at least in part from surveys conducted within the online application.

18. The apparatus as in claim 11, wherein the online application is a software as a service (SaaS) application.

19. The apparatus as in claim 11, wherein traffic for the online application is conveyed via a software defined network and wherein the predictive routing engine reroutes traffic for the online application via a controller for the software defined network.

20. A tangible, non-transitory, computer-readable medium storing program instructions that cause a supervisory service to execute a process comprising:
    obtaining, by the supervisory service, a first set of user experience survey data from a first set of users of an online application whose traffic was rerouted by a predictive routing engine;
    obtaining, by the supervisory service, a second set of user experience survey data from a second set of users of the online application whose traffic was not rerouted by the predictive routing engine;
    generating, by the supervisory service and using the first set of user experience survey data and the second set of user experience survey data, a user experience prediction model to predict user experience scores for the online application; and
    adjusting, by the supervisory service, the predictive routing engine using predicted user experience scores from the user experience prediction model.

* * * * *

UNITED STATES PATENT AND TRADEMARK OFFICE
CERTIFICATE OF CORRECTION

PATENT NO. : 11,456,926 B1
APPLICATION NO. : 17/314532
DATED : September 27, 2022
INVENTOR(S) : Grégory Mermoud et al.

It is certified that error appears in the above-identified patent and that said Letters Patent is hereby corrected as shown below:

In the Specification

Column 8, Line 20, please amend as shown:
in FIGS. 3A-3B, and the like.

Column 8, Line 63, please amend as shown:
Internet, MPLS, LTE transports providing highly varying Column 10, Line 44, please amend as shown:
experience survey data from users of an online application Column 11, Line 2, please amend as shown:
communication therewith, or the like, to provide a super- Column 11, Line 45, please amend as shown:
instance, UES 502 may send a custom message to an end Column 11, Line 65, please amend as shown:
More specifically, a goal of agent 514 is to monitor the Column 13, Line 49, please amend as shown:
over Wi-Fi. It is also useful in situations for desktops and Column 14, Line 9, please amend as shown:
Regardless of the survey mechanism, UES 502 has the Column 14, Line 12, please amend as shown:
In particular, UES 502 may split sessions into two sets: one Signed and Sealed this
Twenty-seventh Day of December, 2022

Katherine Kelly Vidal
*Director of the United States Patent and Trademark Office*

CERTIFICATE OF CORRECTION (continued)
U.S. Pat. No. 11,456,926 B1

Column 14, Line 18, please amend as shown:
surveys, it may then measure the impact of predictive Column 14, Line 53, please amend as shown:
triggered by UES 502, the overall system becomes more Column 15, Line 15, please amend as shown:
dataset, which can lead to overfitting and limit com- Column 15, Line 29, please amend as shown:
enough to make a precise assessment. The key here is that